US012626113B2

(12) United States Patent
Noyes et al.

(10) Patent No.: US 12,626,113 B2
(45) Date of Patent: May 12, 2026

(54) NEURAL PROCESSING UNITS (NPUs) AND COMPUTATIONAL SYSTEMS EMPLOYING THE SAME

(71) Applicant: Natural Intelligence Systems, Inc., Boise, ID (US)

(72) Inventors: Harold B Noyes, Boise, ID (US); David Roberts, Meridian, ID (US); Russell Lloyd, Boise, ID (US); William Tiffany, Eagle, ID (US); Jeffery Tanner, Meridian, ID (US); Terrence Leslie, Reva, VA (US); Daniel Skinner, Meridian, ID (US); Indranil Roy, Boise, ID (US)

(73) Assignee: Natural Intelligence Systems, Inc., Boise, ID (US)

( * ) Notice: Subject to any disclaimer, the term of this patent is extended or adjusted under 35 U.S.C. 154(b) by 998 days.

(21) Appl. No.: 17/531,576

(22) Filed: Nov. 19, 2021

(65) Prior Publication Data

US 2022/0164637 A1 May 26, 2022

Related U.S. Application Data

(60) Provisional application No. 63/227,590, filed on Jul. 30, 2021, provisional application No. 63/116,608, filed on Nov. 20, 2020.

(51) Int. Cl.
*G06N 3/063* (2023.01)
(52) U.S. Cl.
CPC .................................... *G06N 3/063* (2013.01)

(58) Field of Classification Search
CPC ........ G06N 3/04; G06N 3/043; G06N 3/0442; G06N 3/0463; G06N 3/063; G06N 3/082;
(Continued)

(56) References Cited

U.S. PATENT DOCUMENTS

| | | |
|---|---|---|
| 10,096,134 B2 | 10/2018 | Yan et al. |
| 10,732,972 B2 | 8/2020 | Figuli et al. |

(Continued)

FOREIGN PATENT DOCUMENTS

| | | |
|---|---|---|
| KR | 20180062910 A | 6/2018 |
| TW | 201937412 A | 9/2019 |
| TW | 202013262 A | 4/2020 |

OTHER PUBLICATIONS

V. Puente et al., Classic: A cortex-inspired hardware accelerator, Elsevier, Journal of Parallel and Distributed Computing 134, 2019 (Year: 2019).*

(Continued)

*Primary Examiner* — Emily E Larocque
(74) *Attorney, Agent, or Firm* — Perkins Coie LLP; Andrew T. Pettit; Vikram Iyengar

(57) ABSTRACT

Introduced here are integrated circuits (also referred to as "chips") that can be implemented in a neural processing unit. At a high level, the goal of these chips is to provide higher performance for machine learning algorithms than conventional processing units would. To accomplish this, the neural processing unit can include multiple computing components, each of which is able to independently determine the overlap between encoded data provided as input and values stored in a memory.

20 Claims, 7 Drawing Sheets

100

(58) Field of Classification Search

CPC .... G06N 5/02–027; G06N 7/02; G06N 7/023;
G06N 7/046

See application file for complete search history.

(56) References Cited

U.S. PATENT DOCUMENTS

| | | |
|---|---|---|
| 2015/0039546 A1 | 2/2015 | Alvarez-icaza et al. |
| 2016/0217164 A1 | 7/2016 | Hawkins et al. |
| 2019/0340490 A1 | 11/2019 | Fishel et al. |
| 2020/0065097 A1 | 2/2020 | Figuli et al. |
| 2020/0336153 A1 | 10/2020 | Ovsiannikov |
| 2020/0336273 A1 | 10/2020 | Ovsiannikov et al. |
| 2021/0049198 A1 | 2/2021 | De Sousa |
| 2021/0089670 A1 | 3/2021 | Daniel et al. |
| 2022/0284273 A1 | 9/2022 | Yoo |

OTHER PUBLICATIONS

L.G. Streat et al., Non-volatile Hierarchical Temporal Memory: Hardware for Spatial Pooling, arXiv:1611.02792v1 [cs.AR], 2016 (Year: 2016).*

Y.Cui et al., The HTM Spatial Pooler—A Neocortical Algorithm for Online Sparse Distributed Coding, frontiers in Computational Neuroscience, 2017 (Year: 2017).*

A.M. Zyarah et al., Neuromemrisitive Architecture of HTM with On-Device Learning and Neurogenesis, ACM Journal on Emerging Technologies in Computing Systems, vol. 15, No. 3, Article 24, 2019 (Year: 2019).*

International Search Report and Written Opinion mailed Nov. 22, 2022 in International Patent Application No. PCT/US22/38930, 10 pages.

Purdy, S. "Encoding Data for HTM Systems", arXiv:1602.05925. Feb. 2016 [retrieved on Nov. 7, 2022]. Retrieved from <https://arxiv.org/ftp/arxiv/papers/1602/1602.05925.pdf>, pp. 2-3.

Ran, Y. et al., "Text classification algorithm based on sparse distributed representation", 2020 IEEE International Conference on Advances in Electrical Engineering and Computer Applications (AEECA), Oct. 6, 2020, pp. 876-878.

Ahmad, S. et al., "How do neurons operate on sparse distributed representations? A mathematical theory of sparsity, neurons and active dendrites." Numenta, Inc. retrieved from the internet on Feb. 24, 2022 at <https://arxiv.org/ftp/arxiv/papers/1601/1601.00720.pdf>, 54 pages.

International Search Report and Written Opinion mailed Mar. 15, 2022 in International Patent Application No. PCT/US21/60191, 10 pages.

Boudreau, Lukeg. , "Contractive Autoencoding for Hierarchical Temporal Memory and Sparse Distributed Representation Binding", Rochester Institute of Technology, 2018. 93 pages.

Webber, Francisco, "Semantic folding theory and its application in semantic fingerprinting", arXiv preprint arXiv:1511.08855, 2015. 59 pages.

Zhang, et al., "A survey of sparse representation: algorithms and applications.", IEEE access 3 (2015): 490-530. 41 pages.

* cited by examiner

200

Encoded Input Frame

Synaptic Strength Values
Memory (SSVM)
202
[64,000 x 8]

SSV Threshold 204

SSV
Threshold

SSV

Comparator
210

Overlap = (SSV ≥ SSV Threshold)

Overlap Counter 206

Sort
Control

Overlap
Count

Overlap Score Sort Module
208

Ordered List of
"Winning" Digital
Neurons

Sort Mask

NEURAL PROCESSING UNITS (NPUs) AND COMPUTATIONAL SYSTEMS EMPLOYING THE SAME

CROSS-REFERENCE TO RELATED APPLICATIONS

This application claims priority to U.S. Provisional Application No. 63/116,608, titled "Neural Processing Units (NPUs) and Artificial Intelligence (AI) and/or Machine Learning (ML) Systems Employing the Same" and filed on Nov. 20, 2020, and U.S. Provisional Application No. 63/227,590, titled "Explainable Machine Learning (ML) and Artificial Intelligence (AI) Methods and Systems Using Encoders, Neural Processing Units (NPUs), and Classifiers" and filed on Jul. 30, 2021, each of which is incorporated by reference herein in its entirety.

TECHNICAL FIELD

Various embodiments concern processing units with hardware architectures suitable for artificial intelligence and machine learning processes, as well as computational systems capable of employing the same.

BACKGROUND

Historically, artificial intelligence (AI) and machine learning (ML) processes have been implemented by computational systems (or simply "systems") that execute sophisticated software using conventional processing units, such as central processing units (CPUs) and graphics processing units (GPUs). While the hardware architectures of these conventional processing units are able to execute the necessary computations, actual performance is slow relative to desired performance. Simply put, performance is impacted because too much data and too many computations are required.

This impact on performance can have significant ramifications. As an example, if performance suffers to such a degree that delay occurs, then AI and ML processes may not be implementable in certain situations. For instance, delays of less than one second may prevent implementation of AI and ML processes where timeliness is necessary, such as for automated driving systems where real-time AI and ML processing affects passenger safety. Another real-time system example is military targeting systems, where friend-or-foe decisions must be made and acted upon before loss of life occurs. Any scenario where real-time decisions can impact life, safety, or capital assets are applications where faster AI and ML processing is needed.

Entities have historically attempted to address this impact on performance by increasing the computational resources that are available to the system. There are several drawbacks to this approach, however. First, increasing the computational resources may be impractical or impossible. This is especially true if the AI and ML processes are intended to be implemented by systems that are included in computing devices such as mobile phones, tablet computers, and the like. Second, increasing the computational resources will lead to an increase in power consumption. The power available to a system can be limited (e.g., due to battery constraints), so limiting power consumption is an important aspect of developing new technologies.

Figure 1:
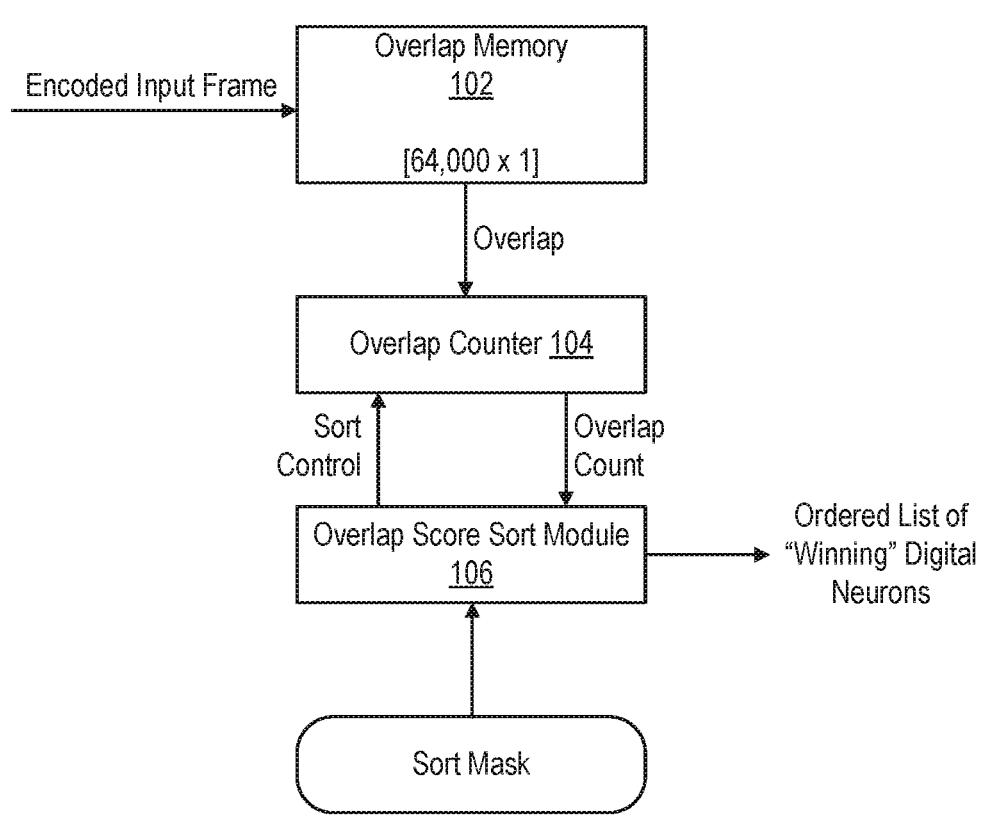
FIG. 1 includes a diagrammatic illustration of a hardware-based architecture of a digital neuron that is implementable in a neural processing unit (NPU).

Features of the technology described herein will become more apparent to those skilled in the art from a study of the Detailed Description in conjunction with the drawings. Various embodiments are depicted in the drawings for the purpose of illustration. However, those skilled in the art will recognize that alternative embodiments may be employed without departing from the principles of the present disclosure. Accordingly, although specific embodiments are shown in the drawings, the technology is amenable to various modifications.

DETAILED DESCRIPTION

Introduced here are integrated circuit devices (also referred to as "chips") that can be implemented in a neural processing unit. The terms "neural processing unit," "neural processor," and "NPU" may be used to refer to an electronic circuit that is designed to implement some or all of the control and arithmetic logic necessary to execute ML algorithms, usually with a separate data memory (or simply "memory") and dedicated instruction set architecture. At a high level, the goal of the NPU is to provide higher performance for these ML algorithms than conventional processing units (e.g., CPUs and GPUs) would. To accomplish this, the NPU can employ a large number of computing components to leverage high data-level parallelism as further discussed below. Because the NPU is intended to imitate how a human brain works, these computing components may be referred to as "digital neurons."

The NPU can utilize various technologies to perform AI and ML processes in an improved manner. However, the chips introduced here may play a key role in allowing the necessary computations to be performed locally (i.e., on chip) in an efficient manner. These chips can have hardware architectures that result in improvement in performance of AI and ML processes by orders of magnitude, while also reducing the power required to perform those AI and ML processes by orders of magnitude. As an example, the hardware architectures of these chips may permit digital image frames to be processed roughly 1,200 times faster than artificial neural networks (ANNs) during model training, and roughly 10.3 times faster than ANNs during inference. In comparison to conventional processing units, the NPU can achieve better performance through the use of the hardware architectures described herein.

While the underlying hardware architecture may remain largely the same, chips can be designed, constructed, and/or trained with different applications in mind. As such, the chips introduced here could be designed as, or implemented in, application-specific integrated circuits (ASICs) that are designed for a specific application, or these chips could be designed as, or implemented in, field-programmable gate arrays (FPGAs) that can be reprogrammed for multiple applications. Several different hardware architectures are described in the present disclosure, and these hardware architectures may be implementable regardless of whether the underlying circuitry is reconfigurable or permanent.

Overview of NPU with Digital Neurons

FIG. 1 includes a diagrammatic illustration of a hardware-based architecture of a digital neuron 100 that is implementable in an NPU. Any sensory input can be treated by the digital neuron 100 as an array data structure (or simply "array") of different bits of information. Examples of sensory inputs (or simply "inputs") include the pixels of a digital image, the values generated by a sensor, and the like. The nature of the input can vary based on the intended application(s) of the digital neuron 100. For the purpose of illustration, the array may be called an "input frame" that is obtained, as input, by the digital neuron. At a high level, the input frame is representative of a data structure that comprises a collection of elements, each of which is identifiable by at least one array index or key.

The digital neuron 100 can be designed, constructed, and/or trained so as to allow the NPU to process an input frame in a manner similar to a human brain. For the input frame, the digital neuron 100 can be programmed to detect certain bits of information while ignoring other bits of information. Said another way, the digital neuron 100 may detect the information stored in some elements of the array and ignore the information stored in other elements of the array. The relationship—namely, which elements are detected and ignored—is called the "overlap" of the digital neuron 100 to the input frame. The bitmask (also called a "mask") that governs the overlap can be programmed into an overlap memory 102. The mask may be a binary image comprising zero values and non-zero values whose dimensions may be identical to the input frame. Accordingly, the mask can include a series of values, and each value may correspond to a respective element in the input frame.

Generally, the overlap memory 102 is part of the digital neuron 100, and thus dedicated to storing information relevant to the digital neuron 100. If the information included in the input frame is to be used as addresses to a memory or a data structure, then the digital neuron 100 can perform a logic AND function as follows:

$$[\text{(Input Frame Address) AND (Overlap Enabled)}]. \qquad \text{Eq. 1}$$

To accomplish this, the overlap memory 102 can contain one value for each element in the input frame. Note that because the digital neuron 100 is intended to imitate a biological neuron, these values and their corresponding offset address to each element in the input frame may be referred to as "synapses." Thus, a "synapse" may be represented by its value and its offset address in the input frame. Accordingly, the overlap memory 102 of the digital neuron 100 may include a separate value for each synapse. In embodiments where the NPU includes multiple digital neurons, the total number of synapses included in the NPU will be the number of digital neurons multiplied by the number of elements included in the input frame.

The addresses of the input frame can be obtained in various ways. In some embodiments, the addresses are obtained through a simple mapping of the information in the input frame—presented as a series of n-bit addresses—to the overlap memory 102. Alternatively, the addresses could be obtained through an encoding scheme that produces, as output, a series of n-bit addresses. As an example, the digital neuron 100 could encode the input frame as a Sparse Distributed Representation (SDR) as shown in FIG. 1, such that the encoded data only includes the addresses of certain elements in the array. Regardless of the approach, obtaining the addresses of the input frame allows the digital neuron 100 to perform the logic AND function in Eq. 1. In Eq. 1, (Input Frame Address) is representative of an address of the input frame, while (Overlap Enabled) is representative of a value that determines whether the synapse is connected to the data space of the input frame at the address.

The example shown in FIG. 1 illustrates that, for a possible 64,000-bit SDR data space with a 1-bit overlap value, the digital neuron 100 has a 64,000×1 memory. In this example, the synapses are either connected (i.e., where the overlap value equals one) or not connected (i.e., where the overlap value equals zero). Meanwhile, the SDR used to encode the input frame may have 16 bits to represent all possible positions of the 64,000-bit SDR data space.

The number of digital neurons that are desired for a given NPU will dictate the number of times that the hardware architecture shown in FIG. 1 is duplicated. While each digital neuron included in an NPU normally has its own dedicated overlap memory 102 and overlap counting circuit 104 (also referred to as an "overlap counter"), an overlap score sort module 106 (also called a "scoring module") may be common circuitry amongst the digital neurons that takes, as input, a count produced by each overlap counter and then compares the counts to output a list of at least one "winning" digital neuron. For example, if 1,000 digital neurons are desired, then 1,000 copies of the hardware architecture shown in FIG. 1 can be interconnected to create the NPU. Accordingly, an NPU may include n digital neurons. While n could be any integer value, n is normally in the range of several hundred to several thousand to enable high data-level parallelism. The number of digital neurons n will also vary to accommodate the complexity of the problem. Many AI and ML applications will need no more than 1,000 digital neurons, while more complex image processing applications may require 20,000 or more digital neurons. Note that all of the digital neurons included in an NPU can process the same input frame independently but in parallel.

Each digital neuron included in an NPU can be programmed to respond to, or "overlap" with, a subset of the maximum possible input frame elements (e.g., the data space of the entire SDR) by setting values for the appropriate bits in the overlap memory 102. Thus, multiple digital neurons may collectively cover the entirety of the maximum possible data space. Each time that the address to the digital neuron 100 references one of these set values, an overlap counter 104 can increment its overlap count. When the entire input frame has been processed, the overlap count can be provided to an overlap score sort module 106. The overlap score sort module 106 can produce an overlap score based on the overlap count, so as to quantify the degree to which the input frame overlaps with the mask in the overlap memory 102. As further discussed below, the overlap score may simply be the overlap count in some embodiments, while in other embodiments the overlap count may be modified (e.g., using a boost factor) to produce the overlap score. In some embodiments, the overlap score sort module 106 is implemented via software, firmware, and/or hardware that is part of the digital neuron 100. In other embodiments, the overlap score sort module 106 is implemented via software, firmware, and/or hardware that is accessible to the digital neuron 100. For example, the overlap score sort module 106 may be implemented on the board of the NPU, such that the overlap score sort module 106 can be communicatively connected to all digital neurons of the NPU.

The overlap score sort module 106 can obtain overlap scores from all digital neurons included in the NPU for comparison purposes. Those digital neurons with the highest overlap scores can be identified by the overlap score sort module 106 as "winning" digital neurons. For example, the overlap score sort module 106 may perform a clustering operation to identify one or more digital neurons whose overlap scores are largest by a statistically significant margin. As another example, the overlap score sort module 106 could be designed such that a programmable number of the highest overlap scores become the "winning" digital neurons. The number of winning neurons is typically chosen to be a sparse result (few winners chosen from the total number of digital neurons in the system), and such sparse results provide mathematical advantages of noise immunity and high learning capacity in the system. The identities or addresses of the "winning" digital neurons can be produced, as output, by the overlap score sort module 106. This output allows the NPU to draw meaningful conclusions from the input frame that is processed by each digital neuron.

Systems designed for AI and ML processes may include more than one NPU. For example, two or more NPUs can be designed into the system (e.g., on a single board or multiple boards) in order to further improve performance of AI and ML processes. In such embodiments, the list produced by each NPU may be representative of potential "winning" digital neurons. In order to identify the actual "winning" digital neurons, counts produced by overlap counters across multiple NPUs may be compared by the overlap score sort module 106. Assume, for example, that a system includes two NPUs. In such a scenario, the overlap score sort module 106 or another computing component (e.g., a controller that is communicatively coupled to the multiple NPUs) may not only compare the count output by a given overlap counter included in one NPU (also referred to as a "first NPU") against counts output by other overlap counters on the first NPU, but also against counts output by overlap counters on another NPU (also referred to as a "second NPU"). To accomplish this, the overlap score sort module 106 may compare the list of "winning" digital neurons produced for the first NPU against the list of "winning" digital neurons produced for the second NPU, so as to identify the actual "winning" digital neurons.

The output of this process may be an ordered list, from highest overlap count value to lowest overlap count value. Ties may be handled in a predictable (e.g., predetermined) manner, for example, based on priorities assigned to the NPUs, digital neurons, etc. The number of actual "winning" digital neurons included in the ordered list may be prescribed by a configuration setting in the system. For example, the configuration setting may be defined in each NPU, so as to govern the size of the ordered list of potential "winning" digital neurons produced by each NPU. The size of the ordered list of actual "winning" digital neurons may be based on the size of these ordered lists of potential "winning" digital neurons. For example, these ordered lists may be the same size, or the ordered list of actual "winning" digital neurons may be representative of a reordered concatenation of these ordered lists of potential "winning" digital neurons.

After the ordered list of actual "winning" digital neurons has been produced, each NPU can be notified of the digital neurons that were determined to be actual "winners." As an example, the overlap score sort module 106 or another computing component (e.g., a controller that is communicatively coupled to the multiple NPUs) may transmit, to each of the multiple NPUs, a signal that identifies the actual "winning" digital neurons. Each NPU can then implement a learning cycle (e.g., for SSVs or boost factors) as necessary. Because each NPU may need to be notified regarding the "winning" digital neurons, the output produced by each NPU can include more than just the counts produced by its overlap counters, the output may also include information (e.g., addresses) to permit identification of its digital neurons.

The overlap memory 102 could be constructed and/or organized in various ways. Different approaches to construction and/or organization may allow for various sizes of digital neurons. For example, the overlap memory 102 could be representative of a dynamic random-access memory (DRAM), static random-access memory (SRAM), Lookup Table (LUT), register file, or any other collection of memory elements, cells, or modules to which data can be written.

As shown in FIG. 1, the overlap score sort module 106 could also utilize a sorting bitmask (also called a "sorting mask" or "sort mask") that helps in the winner sort operation by masking off each digital neuron, in order, from highest to lowest overlap within a block. Once a digital neuron is identified as having the highest overlap within the block, the digital neuron can be masked off from the next round of sorting until all digital neurons within the block have been masked (and thus sorted into an ordered list). Accordingly, the overlap score sort module 106 can use the sort mask to iteratively mask off digital neurons within the block from highest to lowest overlap, so as to generate an ordered list of the digital neurons.

In sum, there are several core concepts that allow for the implementation of an NPU that is able to perform complex computations in an efficient manner. First, each digital neuron can use an input frame that is encoded (e.g., as an SDR) as addresses to the corresponding overlap memory. Second, the overlap memory in each digital neuron can implement a programmable overlap mapping capability in which stored values indicate whether there is a connection with the data space of the input frame at the corresponding addresses. For example, a value of one may indicate a connection to the data space of the input frame while a value of zero may indicate no connection to the data space of the input frame. Third, an overlap counter in each digital neuron may be able to calculate an overlap score that is indicative of the number of times that an address references a bit in the overlap memory with a set value of one. Fourth, the NPU can implement logic to sort the overlap scores of the digital neurons and then output an ordered list of "winning" digital neurons. As an example, an overlap score sort module may be responsible for outputting an ordered list of a programmed number of digital neurons having the highest overlap scores.

Overview of NPU with Basic Learning Capabilities

Systems that are involved in AI and ML processes may require more than the basic functionalities discussed above with reference to FIG. 1. For example, a single digital neuron may have "overlapping connections" with one or more other digital neurons similar to the biological synapses of the human brain. These "overlapping connections" across the width of the encoded input frame can be connected and/or disconnected as the NPU learns over time. The term "encoded input frame width" refers to the total range of addresses that can possibly occur across an encoded input frame. As an example, the term "SDR width" may be used to refer to the total range of values that are possible across an SDR (e.g., SDR[15:0]).

This connection/disconnection functionality can be used to indicate more than whether a given synapse is connected or disconnected. It can also indicate how "far away" the given synapse is from the connection/disconnection threshold similar to an analog component. Thus, it can indicate the distance of any given synapse from becoming connected or disconnected, and thus the "strength" of the synaptic connection.

Figure 2:
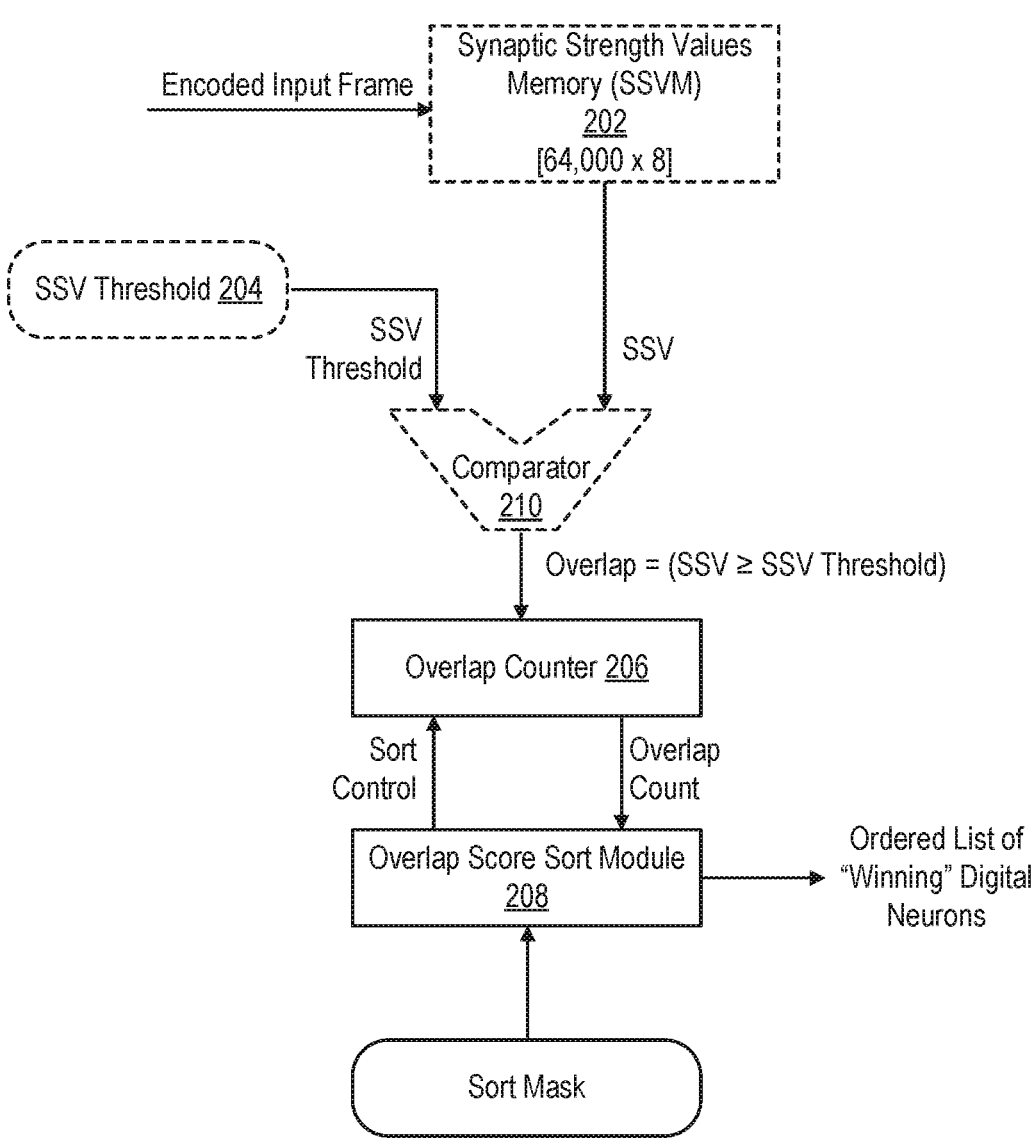
FIG. 2 includes a diagrammatic illustration of a hardware-based architecture of a digital neuron that is able to implement a basic learning mechanism.

FIG. 2 includes a diagrammatic illustration of a hardware-based architecture of a digital neuron 200 that is able to implement a basic learning mechanism. The digital neuron 200 of FIG. 2 is generally comparable to the digital neuron 100 of FIG. 1, and additions are shown using dashed lines. As shown in FIG. 2, the overlap memory 102 of FIG. 1 is replaced by a synaptic strength values memory (SSVM) 202. At a high level, the SSVM 202 is a memory that allows each synapse to be a multi-bit value instead of a single-bit value. In FIG. 2, for example, each synapse is an eight-bit value rather than simply one or zero.

A given synapse can be identified as either connected or disconnected from the data space of the input frame based on the strength of the given synapse when compared to a synaptic strength value threshold 204 (also referred to as an "SSV threshold" or simply "threshold"). In some embodiments, the SSV threshold 204 is global across all digital neurons of the NPU. In other embodiments, the SSV threshold 204 is local across one or more digital neurons of the NPU. For example, the SSV threshold 204 could apply to a group of digital neurons that is representative of a subset of all digital neurons of the NPU. As another example, each digital neuron could have its own SSV threshold 204.

If the synaptic strength value (SSV) contained in the SSVM 202 for a given synapse is greater than or equal to the SSV threshold 204, then the given synapse can be identified as connected. Conversely, if the SSV contained in the SSVM 202 for a given synapse is less than the SSV threshold 204, then the given synapse can be identified as not connected. Generally, this comparison is performed by a comparator circuit 210 (or simply "comparator") that is designed to indicate whether an input (e.g., the SSV) has reached a predetermined value (e.g., the SSV threshold 204). If a synapse is identified as connected, then the overlap counter 206 can be incremented. If a synapse is identified as not connected, then the overlap counter 206 may not be incremented, or may even be decremented or otherwise "penalized" to account for the effect of disconnected synapses. When the entire input frame (e.g., the whole SDR) has been processed, the overlap scores of all digital neurons included in the NPU can be examined by the overlap score sort module 208 as discussed above.

A specific SSV (e.g., SSV=00h or SSV=FFh) may be reserved to indicate whether the corresponding synapse in a given digital neuron even exists. As an example, an SSV of "00h" could indicate that the corresponding synapse can never "fire," can never "overlap" the input frame, and is therefore never updated during a learning cycle. Said another way, an SSV of "00h" could indicate that the corresponding synapse does not exist for all intents and purposes.

In comparison to the digital neuron 100 of FIG. 1, the digital neuron 200 of FIG. 2 allows the NPU to perform basic learning. This can be accomplished by implementing, in each digital neuron, a memory (e.g., the SSVM 202) that is capable of storing multi-bit values in order to permit a programmable value mapping capability. Additionally, each digital neuron may include a comparator 210 that is responsible for comparing values output from the memory against a threshold (e.g., the SSV threshold 204), so as produce a signal that can be used by an overlap counter 206 to compute, infer, or otherwise determine the overlap count. As mentioned above, the comparator 210 may compare two signals (e.g., representative of the SSV and SSV threshold 204) and then output either a one or a zero to indicate which of the two signals is larger.

In FIG. 2, the SSV threshold 204 is shown as a solitary input that is provided to the comparator 210 along one channel. Similarly, the SSVs output from the memory are shown as a solitary input that is provided to the comparator across another channel. This need not necessarily be the case, however. For example, each of these channels may be included in a series of connections (also referred to as a "bus") that is interconnected between the respective source and comparator 210. The number of connections included in the bus may depend on the number of bits included in each synapse. For example, if each synapse is an eight-bit value as shown in FIG. 2, then the bus interconnected between the SSVM 202 and comparator 210 may have eight channels. Similarly, the bus along which the SSV threshold 204 is provided to the comparator 210 may have eight channels.

Overview of NPU with Enhanced Learning Capabilities

While the NPU 200 shown in FIG. 2 has basic learning capabilities, it may not provide optimal learning results under some conditions. Boosting can be thought of as a way to avoid producing a sub-optimal set of "winning" digital neurons after at least one learning cycle. Assume, for example, that an NPU includes a set of digital neurons that are arranged in columns, each of which includes at least one digital neuron, with interconnections therebetween. If a column is "losing," then learning will not occur—even if the column is better connected (e.g., in terms of potential synaptic connections) than another column that is "winning" regularly. Boosting gives digital neurons with fewer connected synapses an opportunity to "win," thereby allowing learning to occur and strengthening its synapses. If a digital neuron is determined to be better (i.e., more optimal) for a given pattern, then the digital neuron will be trained appropriately. Accordingly, boosting can modulate the learning of the digital neurons, giving all columns a chance to learn and become stronger.

Figure 3:
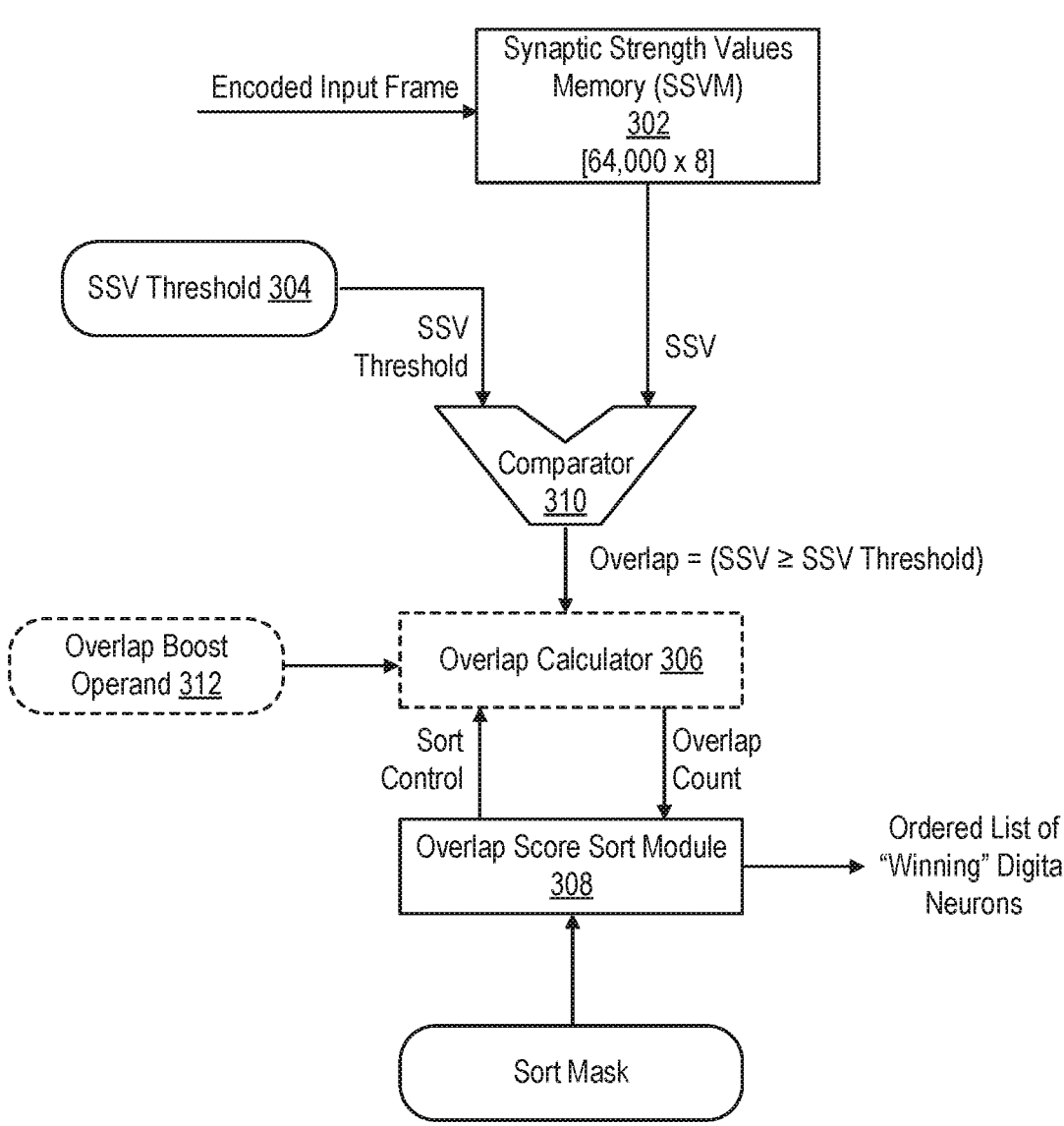
FIG. 3 includes a diagrammatic illustration of a hardware-based architecture of a digital neuron that is able to implement an enhanced learning mechanism.

FIG. 3 includes a diagrammatic illustration of a hardware-based architecture of a digital neuron 300 that is able to implement an enhanced learning mechanism. The digital neuron 300 of FIG. 3 is generally comparable to the digital neuron 200 of FIG. 2, and additions are shown using dashed lines. As shown in FIG. 3, the overlap counter 206 of FIG. 2 is replaced with an overlap calculator circuit 306 (or simply "overlap calculator").

To allow for improved learning, the overlap calculator 306 can be programmed to add different values—rather than simply increment—when an SSV contained in the SSVM 302 is determined to be greater than or equal to the SSV threshold 304 based on an output produced by the comparator 310. Said another way, the overlap calculator 306 may add different values when the digital neuron 300 overlaps the input frame. This enables synapses that are far away from the connection/disconnection threshold to be brought to that threshold in fewer learning cycles.

Also shown in FIG. 3 is the addition of an overlap boost operand 312 to the overlap calculator 306. At a high level, the overlap boost operand 312 can specify the data that is to be operated on by the overlap calculator 306, while at the same time representing the data itself. Generally, the overlap boost operand 312 is a programmable, multi-bit value that is fed into the overlap calculator 306 and then used to "boost"

learning by increasing the influence of synapses that overlap the input frame. Because the overlap boost operand 312 will influence learning performance of the digital neuron 300, an algorithm—implemented in software, firmware, hardware, or a combination thereof—may be responsible for adjusting the overlap boost operand 312 to achieve a desired learning performance goal. For example, the overlap boost operand 312 may be a non-linear function that increases more rapidly the less that a digital neuron "wins," and decreases more rapidly the more that a digital neuron "wins." In this way the overlap boost operand 312 can get increasingly strong to get losing digital neurons over the "hump" and give them a chance to win, learn, and become stronger. The shape of the overlap boost operand function curve can be static, or it can be programmed to change shape over time as the system learns.

The hardware-based architecture shown in FIG. 3 will cause the digital neurons of the NPU to have individual, rather than global, overlap boost operands. This allows the learning performance of each digital neuron to be individually manipulated through adjustment of the corresponding overlap boost operand. Other NPUs could be designed with global overlap boost operands (i.e., where all digital neurons have the same overlap boost operand) or semi-global overlap boost operands (i.e., where different subsets of digital neurons have different overlap boost operands). In embodiments where the overlap boost operand is global or semi-global, the overlap boost operand may be managed, stored, or provided by another computing component of the NPU, rather than the digital neuron itself.

When the entire input frame (e.g., the whole SDR) has been processed, the overlap scores of all digital neurons included in the NPU can be examined by the overlap score sort module 308 as discussed above.

Local Updating of SSVs

By definition, any NPU that "learns" will change and adapt its behavior throughout the learning process. This can occur quite slowly, however. Consider, for example, an NPU that is capable of handling a 64,000-bit input frame and that includes 512 digital neurons. This NPU will include 32,768,000 synapses in total (i.e., 64,000 multiplied by 512). Each synapse can be adjusted based on (i) the input frame (e.g., the SDR) that is processed, (ii) whether or not the corresponding digital neuron was deemed to be a "winning" digital neuron, and/or (iii) the current SSV of that synapse. When performed by a remote processing unit (also referred to as an "external processing unit" or "off-chip processing unit"), the learning process may be extremely slow.

Figure 4:
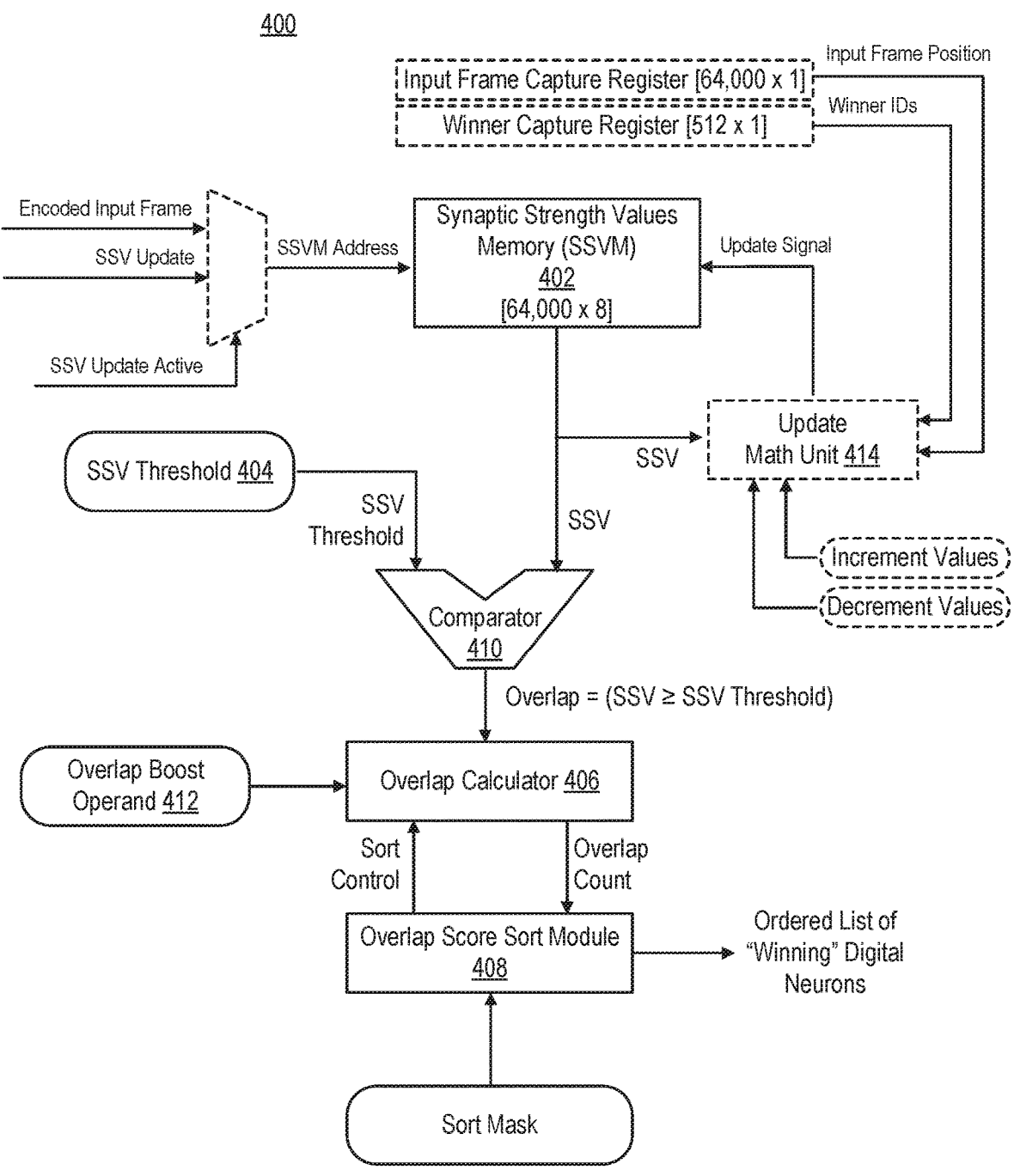
FIG. 4 includes a diagrammatic illustration of a hardware-based architecture of a digital neuron that is able to perform a learning process locally, so as determine and then implement adjustments to synaptic strength values (SVVs) stored in memory as necessary.

By adjusting synapses locally—namely, on the NPU—the learning process can be hastened significantly. It also allows adjustments to be determined and then implemented by the digital neurons in parallel. FIG. 4 includes a diagrammatic illustration of a hardware-based architecture of a digital neuron 400 that is able to perform the learning process locally, so as determine and then implement adjustments to the SSVs as necessary. The digital neuron 400 of FIG. 4 is generally comparable to the digital neuron 300 of FIG. 3, and additions are shown using dashed lines.

As shown in FIG. 4, an update math unit 414 may be responsible for implementing the algorithm that is used for learning purposes. Said another way, the update math unit 414 may be responsible for determining whether to update the SSV that is currently stored in the SSVM 402 for a given synapse to a new SSV. At a high level, the update math unit 414 may be representative of an arithmetic logic unit that allows the digital neuron 400 to perform mathematical operations to determine whether an update of the SSV is necessary based on one or more inputs. If the update math unit 414 determines that the SSV for a given synapse should be updated, the new SSV may be a function of (i) the SSV, (ii) whether or not the corresponding digital neuron is a "winner" for the input frame that is being processed, (iii) whether or not the input frame position of the given synapse is "set=1," and/or (iv) the increment and decrement values for the updating. Accordingly, the update math unit 414 may receive, as input, (i) the input frame position from a first register (also called an "input frame capture register") and (ii) IDs of the "winning" digital neurons from a second register (also called a "winner capture register") in addition to the increment and decrement values, as shown in FIG. 4. As output, the update math unit 414 may produce an update signal that indicates whether the SSVs in the SSVM 402 should be updated.

As mentioned above, the digital neuron 400 may otherwise operate similar to the digital neuron 300 of FIG. 3. Thus, a comparator 410 may be responsible for producing an output that indicates whether an SSV contained in the SSVM 402 is greater than or equal to an SSV threshold 404, and an overlap calculator 406 may be responsible for calculating, based on the output, the number of overlap occurrences for the digital neuron 400. Moreover, the overlap calculator 406 may produce an overlap score that is based on the number of overlap occurrences and, in some embodiments, an overlap boost operand 412 as discussed above. When the entire input frame (e.g., the whole SDR) has been processed, the overlap scores of all digital neurons included in the NPU can be examined by an overlap score sort module 408 as discussed above.

Figure 5:
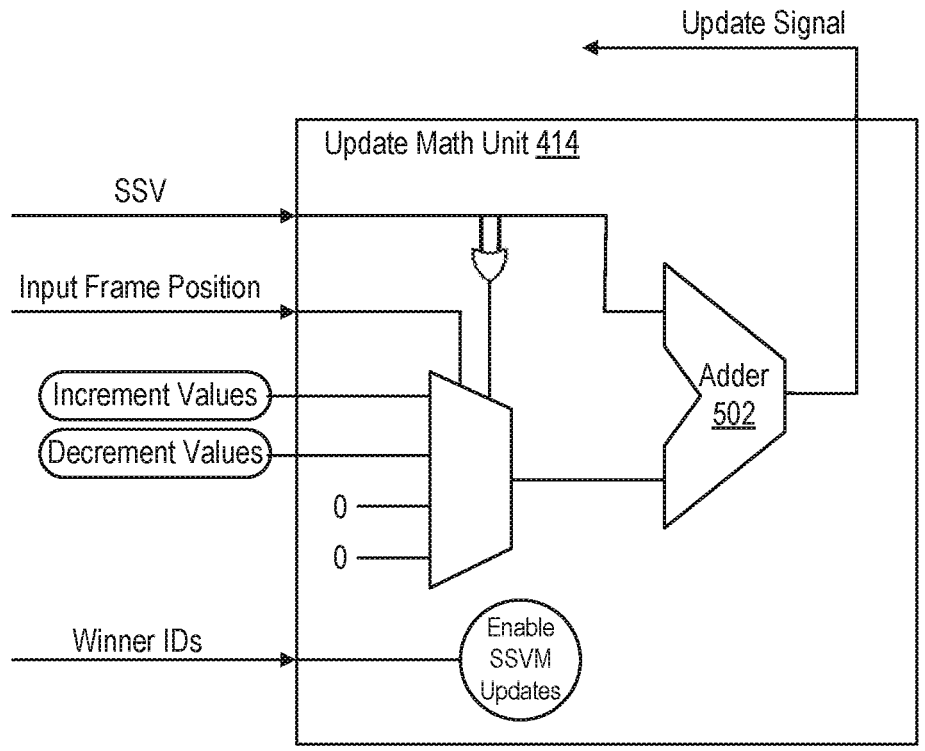
FIG. 5 includes a simplified block diagram of one possible implementation of the update math unit of FIG. 4.

FIG. 5 includes a simplified block diagram of one possible implementation of the update math unit 414 of FIG. 4. As can be seen in FIG. 5, the update math unit 414 can take, as input, (i) the current SSV, (ii) the input frame position, (iii) an indication of whether the corresponding digital neuron is a "winner," (iv) increment values, and/or (v) decrement values. These inputs can be provided to an adder 502 that produces, as output, an update signal. The adder 502 may be representative of a digital circuit that is designed to perform addition of numbers, so as to produce the update signal based on the inputs. While the embodiment shown in FIG. 5 is described in the context of a math unit 414 that includes an adder 502, those skilled in the art will recognize that the math unit 414 could include or implement functions other than the adder 502 to generate the update signal. As an example, the math unit 414 could perform a floating point operation using a floating-point unit (FPU). In this scenario, the increment values and decrement values may not be integers, but may instead by generated by a floating point function that generates a non-linear curve of values.

Additional details regarding an example of an algorithm that could be implemented by the update math unit 414 are provided in Table I. Note that part of the algorithm is that only SSVs corresponding to digital neurons that have been identified as "winners" are updated. In one implementation, a certain value (e.g., SSV=0) is a reserved value that is used to indicate that the corresponding synapse is completely disabled, and therefore never updated. Different SSVs could be used and/or reserved for different purposes.

TABLE I

| Exemplary algorithm implementable by update math unit 414 of FIG. 4. | | | |
|---|---|---|---|
| Inputs | | | Output |
| Winner ID | Input Frame Position | SSV | Update Signal |
| X | X | 0 | 0 |
| 0 | X | SSV | SSV |
| 1 | 0 | SSV | (SSV − Decrement Value) |
| 1 | 1 | SSV | (SSV + Increment Value) |

In sum, several core concepts allow for local updating of an SSVM by a digital neuron. First, the entire input frame can be captured as its contents are processed. As such, the entire input frame can be used to update the SSVM. Second, the "winning" digital neurons can be captured and then used to identify those digital neurons to be adjusted as the SSVM is updated. Third, each digital neuron can include an update math unit that may be responsible for determining whether the SSVs should be updated (and, if so, calculating the new SSVs). Fourth, the control and multiplexing logic needed to update the SSVM can be implemented locally on each digital neuron. For example, the control and multiplexing logic may be partially or entirely implemented on the update math unit that is included in each digital neuron.

Instead of only updating those synapses identified in an input frame, the SSVs for every synapse in the "winning" digital neurons can be updated in accordance with the process described above. To accomplish this, logic can be used to reconstruct or capture the entire input frame width. In some embodiments, those synapses not contained in the input frame are assumed to be equal to zero. Therefore, if the input frame capture register is cleared at the start of an image frame, it may capture all of the "0" bits of the input frame width. Then, for each synapse in the input frame, the corresponding bit in the input frame capture register can be set to "1."

It may also be desirable to know the digital neurons that are "global winners" as the SSVM is updated by the update math unit. Because the NPU could be implemented as part of a multi-chip or multi-board system, it is also desirable for the "potential winners" or "local winners" from all of the chips or boards to be collected and then analyzed, so as to identify the "global winners." The chips or boards that contain "true winners" can be notified (e.g., by an overlap score sort module), along with the identification of the one or more digital neurons that are determined to be the "true winners." These "true winners" can then process the updates of the corresponding SSVMs computed by the corresponding update math units. In some embodiments, these notifications cause bits to be set to a given value (e.g., one) in at least one winner capture register. In some embodiments a single winner capture register is maintained by the NPU, while in other embodiments each digital neuron includes its own winner capture register. These set bits in the winner capture register(s) can aid the NPU as it processes the updates to the corresponding SSVMs.

Boost Factor for Locally Accelerating Updates

As mentioned above, one aspect of the learning process is "boosting." This allows learning to be enhanced and improved in certain circumstances. Boosting assumes that, during operation, every digital neuron should be a "winner" at least a certain number of times, so as to ensure that each digital neuron undergoes training. To accomplish this, boosting may require that overlap scores be modified, adjusted, or otherwise manipulated in a non-linear way. As an example, the overlap score (OS) determined by an overlap calculator for a given SSV may be multiplied by a boost factor (BF) to produce a boosted overlap score (BOS) as follows:

$$OS \times BF = BOS. \qquad \text{Eq. 2}$$

As another example, the overlap score (OS) determined by an overlap calculator for a given SSV may be added to a boost factor (BF) to produce a boosted overlap score (BOS) as follows:

$$OS + BF = BOS. \qquad \text{Eq. 3}$$

Regardless of how it is computed, the boosted overlap score (BOS) can then be used to identify the "winning" digital neurons.

Boost factors are generally most effective when they are adjustable, as this allows training to be "tuned." Boost factors can be adjusted periodically in order to optimize performance of the digital neurons (and thus, the NPU). Note, however, that this process can be quite slow when performed by a remote processing unit that is external to the NPU. By locally adjusting the boost factors, this performance bottleneck can be addressed. Said another way, the process by which boost factors are updated can be hastened by performing it locally (i.e., on the NPU).

Figure 6:
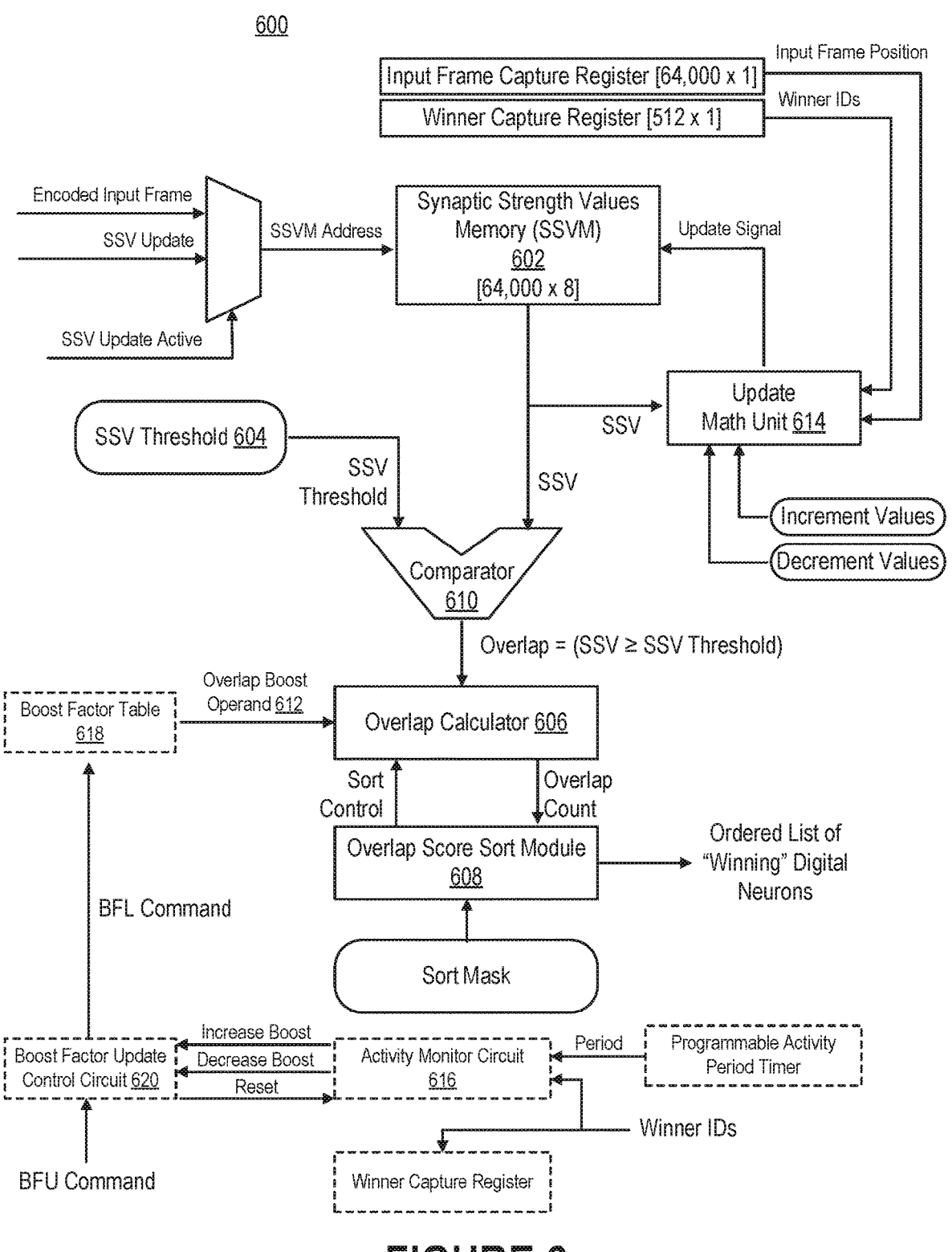
FIG. 6 includes a diagrammatic illustration of a hardware-based architecture of a digital neuron that can locally update a boost factor in an accelerated manner.

FIG. 6 includes a diagrammatic illustration of a hardware-based architecture of a digital neuron 600 that can locally update the boost factor in an accelerated manner. As shown in FIG. 6, three components may be used to accelerate updating of the boost factor, namely, (i) an activity monitor circuit 616 for each digital neuron, (ii) a boost factor table 618 for each digital neuron, and (ii) a boost factor update control circuit 620 for each digital neuron. Generally, the boost factor table 618 is stored in memory of the NPU, though the boost factor table 618 could alternatively be stored in memory that is accessible to the NPU (e.g., on another chip or board).

The digital neuron 600 may operate similar to the digital neuron 400 of FIG. 4. Thus, a comparator 610 may be responsible for producing an output that indicates whether an SSV contained in the SSVM 602 is greater than or equal to an SSV threshold 604, and an overlap calculator 606 may be responsible for calculating, based on the output, an overlap score for the SSV. As mentioned above, the overlap score that is calculated by the overlap calculator 606 could be based on an overlap boost operand 612. Here, however, the boost factor table 618 provides the boost factor that is used by the overlap calculator 606. Each time that one of the synapses of the digital neuron 600 "fires," the overlap calculator 606 can incorporate the boost factor, so as to produce a boosted overlap score that equals the overlap score multiplied by the boost factor or the overlap score added to the boost factor. When the entire input frame (e.g., the whole SDR) has been processed, the overlap scores of all digital neurons included in the NPU can be examined by an overlap score sort module 608 as discussed above.

Figure 7:
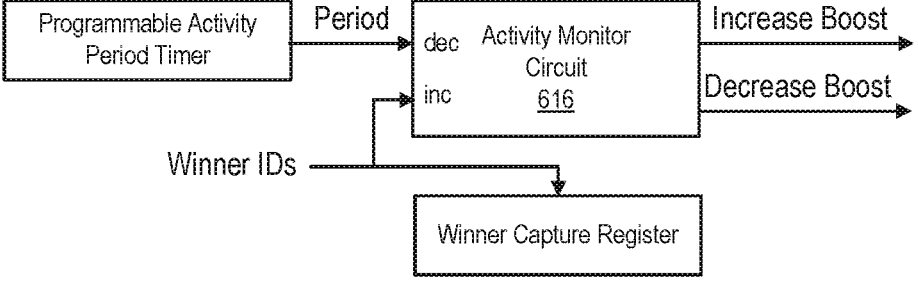
FIG. 7 includes a diagrammatic illustration of the activity monitor circuit of FIG. 6.

In some embodiments, activity is periodically or continuously monitored by an activity monitor circuit 616 for each digital neuron included in the NPU. FIG. 7 includes a diagrammatic illustration of the activity monitor circuit 616 of FIG. 6. The "activity" can be defined in various ways depending on the underlying hardware-based architecture of the digital neuron and intended application of the NPU.

In some embodiments, the "activity" is whether the digital neuron is deemed to be a "winner." In embodiments where the "activity" is whether the digital neuron is deemed to be a "winner," the activity monitor circuit 616 may function as a counter (and thus be called a "winning counter"). Thus, the activity monitor circuit 616 may compute, calculate, or otherwise produce an associated activity count for each digital neuron included in the system. For every input frame that a digital neuron "wins," the activity count may increase. For every input frame that a digital neuron "loses," the activity count may decrease. When the activity count reaches a programmable upper or lower limit, then the boost factor can be adjusted. For example, the boost factor may be decreased when the activity count hits the upper limit (indicating too much "winning") and increased when the activity count hits the lower limit (indicating too much "losing"). After hitting the upper limit or lower limit, the activity count for that digital neuron can be reset to zero.

In other embodiments, the "activity" is whether the digital neuron is not deemed to be a "winner" but is within a threshold distance of being a "winner." In embodiments where the "activity" is whether the digital neuron is considered a "near winner," the activity monitor circuit 616 may also function as a counter (and thus be called a "near winning counter"). Accordingly, the activity monitor circuit 616 may track the number of times that the digital neuron has been deemed a "near winner" in addition to, or instead of, the number of times that the digital neuron has been deemed a "winner."

The interval of time over which "activity" is monitored by the activity monitor circuit 616 can also be defined in various ways. For example, this "activity period" may be defined globally, such that the interval of time is identical across all digital neurons included in the NPU. As another example, the "activity period" could be defined across subsets of digital neurons that are representative of different groups. As another example, the "activity period" could be individual to each digital neuron included in the NPU. In embodiments where the activity period is the same for all digital neurons included in the NPU, there may be a single global timer circuit (or simply "timer") that sets this interval of time. Meanwhile, in embodiments where the activity period is different for each digital neuron included in the NPU, each digital neuron may be associated with a respective local timer that sets the corresponding interval of time.

The activity monitor circuit 616 may allow for a programmable window with upper and lower limits that controls whether the activity count of the digital neuron 600 should be incremented or decremented. This window may be representative of a range whose upper and lower bounds can be programmed. Generally, the upper and lower limits of the window are programmed prior to runtime. However, the upper and lower limits of the window could be modified during learning (e.g., following deployment). As long as the activity count of the digital neuron 600 is within the window, then nothing may occur. However, if the activity count of the digital neuron 600 falls outside of the window, then the activity monitor circuit 616 can generate an instruction that causes the overlap boost operand 612 to be increased or decreased. For example, the activity monitor circuit 616 may generate an instruction to increase the overlap boost operand 612 if the activity count of a given digital neuron is too low (i.e., below the lower bound of the window), and the activity monitor circuit 616 may generate an instruction to decrease the overlap boost operand 612 if the activity count of a given digital neuron is too high (i.e., above the upper bound of the window).

The period signal received from the timer can decrement the activity monitor circuit 616. Meanwhile, the act of notifying the digital neuron 600 that it is a "winner" can increment the activity monitor circuit 616, as well as set the corresponding bit in the winner capture register.

The boost factor update control circuit 620 may be responsible for updating the boost factors that are stored in the boost factor table 618, and therefore can be used by the digital neuron 600. When a boost factor update command (also called a "BFU command") is received, the boost factor update control circuit 620 can evaluate the output produced by the activity monitor circuit 616 in order to determine whether an update is necessary. If an update is determined to be necessary, then the boost factor update control circuit 620 can generate a boost factor load command (also called a "BFL command") to prompt loading of a new boost factor as the overlap boost operand 612. The boost factor update control circuit 620 can then reset the activity monitor circuit 616 to the middle of the window.

In order to facilitate implementation of the hardware-based architecture shown in FIG. 6, additional steps may be taken. Assume, for example, that the encoded input frame is representative of an SDR with 64,000 elements. To ensure that storage of the entire SDR does not significantly affect performance of the SSVM 602, the elements may be "spread" across multiple blocks (also called "cores"). For example, the 8 dual rows that comprise a maximum size (e.g., 64,000 elements) of the SDR may be spread across multiple blocks. This results in the SSVM 602 for each digital neuron being spread across multiple blocks, thereby further accelerating local updates.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A neural processing unit comprising:
a memory in which an array of multi-bit values is stored;
a comparator circuit configured to compare each of the multi-bit values against a threshold, so as to produce a signal as output; and
a calculator circuit configured to
identify, based on the signal, each multi-bit value that exceeds the threshold,
determine a count of the identified multi-bit values, and
modulate the count by (i) multiplying the count by a programmable operand and (ii) adding the count to the programmable operand, so as to produce a boosted count.

2. The neural processing unit of claim 1, wherein the programmable operand is a multi-bit value that is provided to the calculator circuit as input.

3. The neural processing unit of claim 1, further comprising:
a math unit configured to implement an algorithm that, in operation, indicates whether the multi-bit values should be updated.

4. The neural processing unit of claim 3, wherein the math unit is representative of an arithmetic logic unit that determines, for each multi-bit value, whether an update is necessary based on one or more inputs.

5. The neural processing unit of claim 4, wherein the arithmetic logic unit includes an adder that adds the one or more inputs to produce a signal that indicates, for each multi-bit value, whether an update is necessary.

6. The neural processing unit of claim 1,
wherein the memory, the comparator circuit, and the calculator circuit are collectively representative of a computing component,
wherein the computing component is one of multiple computing components, and
wherein the neural processing unit further comprises:
an activity monitor circuit configured to monitor a number of times that the boosted count is among a programmable number of highest boosted counts output by the multiple computing components.

7. The neural processing unit of claim 6, further comprising:
a boosting factor table in which the programmable operand is stored.

8. The neural processing unit of claim 7, further comprising:
an update control circuit configured to evaluate an output produced by the activity monitor circuit to determine whether an update of the programmable operand is necessary.

9. The neural processing unit of claim 8, wherein in response to a determination that the number of times falls below a lower bound of a window,
the activity monitor circuit is further configured to generate an instruction to increase the programmable operand, and
the update control circuit is further configured to generate a load command based on the instruction.

10. The neural processing unit of claim 8, wherein in response to a determination that the number of times exceeds an upper bound of a window,
the activity monitor circuit is further configured to generate an instruction to decrease the programmable operand, and the update control circuit is further configured to generate a load command based on the instruction.

11. A method performed by a neural processing unit, the method comprising:
storing, by a memory, an array of multi-bit values;
comparing, by a comparator circuit, each of the multi-bit values against a threshold, so as to produce a signal as output;
identifying, by a calculator circuit and based on the signal, each multi-bit value that exceeds the threshold;
determining a count of the identified multi-bit values; and
modulating the count by (i) multiplying the count by a programmable operand and (ii) adding the count to the programmable operand, so as to produce a boosted count.

12. The method of claim 11, wherein the programmable operand is a multi-bit value that is provided to the calculator circuit as input.

13. The method of claim 11, further comprising:
implementing, by a math unit, an algorithm that, in operation, indicates whether the multi-bit values should be updated.

14. The method of claim 13, wherein the math unit is representative of an arithmetic logic unit that determines, for each multi-bit value, whether an update is necessary based on one or more inputs.

15. The method of claim 14, wherein the arithmetic logic unit includes an adder that adds the one or more inputs to produce a signal that indicates, for each multi-bit value, whether an update is necessary.

16. The method of claim 11,
wherein the memory, the comparator circuit, and the calculator circuit are collectively representative of a computing component,
wherein the computing component is one of multiple computing components, and
wherein the method further comprises:
monitoring, by an activity monitor circuit, a number of times that the boosted count is among a programmable number of highest boosted counts output by the multiple computing components.

17. The method of claim 16, further comprising:
storing, by a boosting factor table, the programmable operand.

18. The method of claim 17, further comprising:
evaluating, by an update control circuit, an output produced by the activity monitor circuit to determine whether an update of the programmable operand is necessary.

19. The method of claim 18, further comprising:
in response to determining that the number of times falls below a lower bound of a window,
generating, by the activity monitor circuit, an instruction to increase the programmable operand, and
generating, by the update control circuit, a load command based on the instruction.

20. The method of claim 18, further comprising:
in response to determining that the number of times exceeds an upper bound of a window,
generating, by the activity monitor circuit, an instruction to decrease the programmable operand, and
generating, by the update control circuit, a load command based on the instruction.

* * * * *